March 16, 1965

R. P. FARNSWORTH ETAL 3,174,094
HIGH EFFICIENCY POWER SUPPLY UTILIZING
A NEGATIVE RESISTANCE DEVICE

Filed Feb. 1, 1962

INVENTORS.
ROBERT P. FARNSWORTH,
EDWARD J. KAPP,
BY

Walter J. Odam
ATTORNEY.

INVENTORS
ROBERT P. FARNSWORTH,
EDWARD J. KAPP,
BY
Walter J. Adam
ATTORNEY.

United States Patent Office 3,174,094
Patented Mar. 16, 1965

3,174,094
HIGH EFFICIENCY POWER SUPPLY UTILIZING A NEGATIVE RESISTANCE DEVICE
Robert P. Farnsworth, Los Angeles, and Edward J. Kapp, Playa Del Rey, Calif., assignors to Hughes Aircraft Company, Culver City, Calif., a corporation of Delaware
Filed Feb. 1, 1962, Ser. No. 170,353
8 Claims. (Cl. 323—18)

This invention relates to power supplies and particularly to a high efficiency switching type power supply utilizing a negative resistance device.

Conventional nonlinear power supplies utilize elements that are switched between maximum conduction and minimum conduction to provide control of the D.C. (direct current) voltage at the output. The current supplied to the load is generally smoothed in an inductor and controlled by a switch that responds to a linear amplifier which in turn senses the output voltage. These conventional regulators are limited in their response to changes of load and to changes of the voltage at the unregulated source because of the relatively long time required to change the current flow through the inductor. Another disadvantage is that during start up of the power supply the current builds up slowly in the inductor and regulation is not obtained until an undesirable length of time has passed. Some power supplies utilize a class A linear regulator to provide current to the load during start up but have the disadvantage of having a high power dissipation during normal operation. This disadvantage is particularly harmful in systems where conservation of all available energy is essential.

It is therefore an object of this invention to provide a power supply that combines some of the best features of both a switching and a non-switching type power supply.

It is a further object of this invention to provide a simplified and highly efficient switching type power supply utilizing a negative resistance element.

It is a still further object of this invention to provide a power supply utilizing a tunnel diode to control the switching operation.

It is another object of this invention to provide a switching type power supply in which a linear regulator is utilized with improved turn on capability while keeping losses in the linear regulator to a low value.

It is another object of this invention to provide a power supply that requires negligible input current at a no load condition and that requires only a small current flowing through the linear regulator for a steady load condition.

Briefly, the power supply in accordance with this invention includes a switch supplying current to the load through an inductor and a series regulator supplying current directly to the load. This series regulator responds to the voltage at the load both during normal switching operation and in response to a transient increase of load current. A tunnel diode is coupled to the series regulator to respond directly to the current passing therethrough to control the switch. For responding to a transient decrease of load current, a shunt regulator is provided to absorb the current passing through the inductor. The series regulator requires a minimum current during normal operation while still having the capability of responding to transient load changes so as to provide a highly efficient power supply.

The novel features of this invention, as well as the invention and method of operation, will best be understood from the accompanying description taken in connection with the accompanying drawings, in which like reference characters refer to like parts, and in which.

Figures 1, 2:
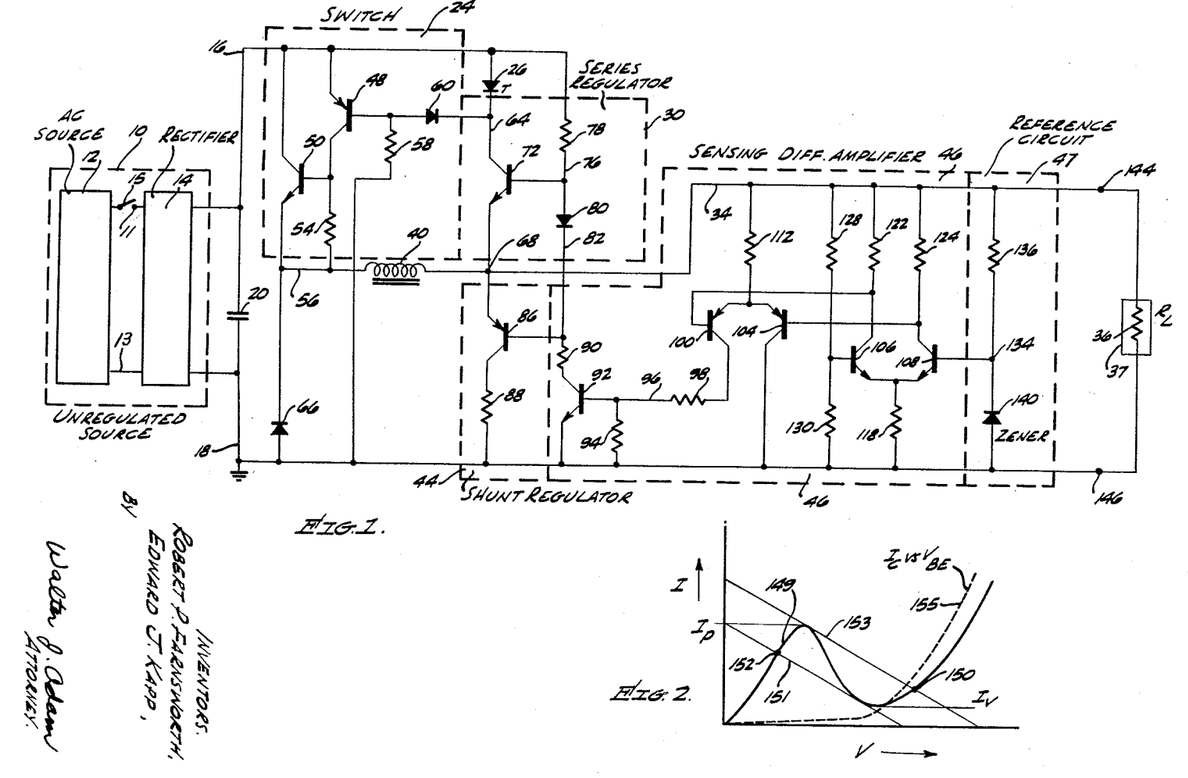
FIG. 1 is a schematic circuit diagram of the high efficiency power supply in accordance with this invention.
FIG. 2 is a graph of current versus voltage for explaining the operation of the tunnel diode and the backward diode utilized in FIG. 1.

Referring first to the circuit diagram of FIG. 1, a source of unregulated voltage 10 may include an A.C. (alternating current) source 12 applying alternating current through leads 13 and 15 to a rectifier 14 which is then applied as an unregulated D.C. (direct current) voltage to leads 16 and 18. The lead 15 may include a switch, as shown, to start and stop the power supply. The source 12 may be an A.C. generator, for example, and the rectifier 14 may include a full wave diode rectifier arrangement, as is well known in the art. The lead 18 may be coupled to ground and a filter capacitor 20 may be coupled between the leads 16 and 18 to provide a D.C. voltage on the lead 16 with a reasonably small ripple. The power supply includes a switch 24 controlled by a negative resistance device such as a tunnel diode 26 which responds to the current passing through a series regulator 30 to a junction point 68 and to a lead 34. The current on the lead 34 flows through a resistor 36 of a load 37 with the resistor 36 having a value $R_L$. Current is also supplied to the load resistor 36 through an inductor 40 with the current applied to the inductor controlled by the switch 24. In order to regulate the voltage on the lead 34 when the load decreases, a shunt regulator 44 is provided coupled across the load 36 and is responsive to a sensing differential amplifier 46 which in turn is coupled to a reference circuit 47.

The switch includes a transistor 48 of the p-n-p type having an emitter coupled to the lead 16 and a collector coupled to the base of a transistor 50 of the n-p-n type as well as through a biasing resistor 54 to a lead 56. The base of the transistor 48 is coupled through a resistor 58 to the ground lead 18 to provide a bias path for a backward diode 60 and is coupled through the anode to cathode path of the backward diode 60 to a lead 64. The backward diode 60 has a high forward current conduction with a very small forward voltage bias, as is well known in the art. The tunnel diode 26 has an anode to cathode path coupled between the leads 16 and 64 to bias the transistor 48 into saturation conduction when the tunnel diode is in a high voltage state and out of conduction when the tunnel diode is in a low voltage state. When the transistor 48 is biased into conduction, the transistor 50 is also biased into saturation conduction to pass current from the lead 16 through the collector and emitter thereof, and through the lead 56 to the inductor 40. A flyback diode 66 which may be a conventional switching diode has an anode to cathode path coupled between the leads 18 and 56 to provide a source of current from ground potential to the inductor 40 when the transistor 50 is biased out of conduction. It is to be noted that when the transistor 50 is biased into conduction, the potential on the lead 16 biases the diode 66 out of conduction.

The inductor 40 supplies current to the junction point 68 and through the lead 34 to the load 37. Because of the delay of the inductor 40 to current changes the series regulator 30 is provided to supply current from the lead 16 to the lead 64, through the collector to emitter path of an n-p-n type transistor 72 and to the junction point 68. The base of the transistor 72 is coupled to a lead 76 which is coupled at one end through a resistor 78 to the lead 16 and at the other end to the anode of a diode 80 which has its cathode coupled to a lead 82, the diode 80 providing a voltage drop between the leads 76 and 82. The shunt regulator 44 includes a p-n-p type transistor 86 having a base coupled to the lead 82, an emitter coupled to the junction point 68 and a collector coupled through a resistor 88 to the lead 18 to pass shunt current from the inductor 40 to ground. The transistor 86 is controlled by the potential at the lead 82 which is coupled through a resistor 90 and through the collector to emitter path of an n-p-n type transistor 92 to the lead 18. The transistors 72 and 86 are of the opposite type and the small voltage drop across the diode 80 insures that only one transistor may conduct at a time. The base of the transistor 92 is coupled through a lead 96 to a biasing resistor 94 which in turn is coupled to the lead 18. Also, the base of the transistor 92 is coupled through a resistor 98 to the collector of a p-n-p type transistor 100. The transistor 92 which responds to the voltage on the lead 34 is included in the sensing differential amplifier 46.

Also included in the sensing amplifier 46 are a transistor 106 and a transistor 108, both of the n-p-n type, to form a first differential amplifier arrangement and transistors 100 and 104 both of the p-n-p type to form a second differential amplifier arrangement. The emitters of the transistors 100 and 104 are coupled through a current limiting resistor 112 to the lead 34 and the collector of the transistor 104 is coupled to the ground lead 18. The emitters of the transistors 106 and 108 are coupled through a current limiting resistor 118 to the lead 18 and the collectors of the transistors 106 and 108 are coupled through respective resistors 122 and 124 to the lead 34. The collector of the transistor 106 is also coupled to the base of the transistor 100 and the collector of the transistor 108 is also coupled to the base of the transistor 104. In order that the transistor 106 senses voltage on the lead 34, the base thereof is coupled to a resistive voltage divider composed of resistors 128 and 130 with the resistor 128 coupled to the lead 134 and the resistor 130 coupled to the ground lead 18. The base of the transistor 108 is coupled to a lead 134 of the reference circuit 47 with the lead 134 being coupled through a resistor 136 to the lead 34 and through the cathode to anode path of a zener diode 140 to the ground lead 18. The sensing differential amplifier 46 operates to cancel out variations of transistor characteristics as the common resistors 112 and 118 causes one transistor of the transistors 106 and 108 or of the transistors 100 and 104 to decrease conduction when the other transistor of that pair increases conduction. The lead 34 is coupled to the load resistor 36 of the load 37 through an output terminal 144 and the lead 18 is coupled to the load resistor 36 through an output terminal 146. It is to be noted that the tunnel diode 26 may also be coupled in the current path at the emitter of the transistor 72 with the base of the transistor 48 coupled thereto to effectively respond to the current flowing through the series regulator, in accordance with the principles of this invention.

In operation, the power supply of FIG. 1 may be turned on or started by closing the switch 15 resulting in a relatively large current flowing through the lead 16, through the tunnel diode 26 and through the transistor 72 to the junction point 68 and the load 36. Thus, the tunnel diode 26 in response to the relatively large current flow therethrough is triggered to a high voltage low current state at a point 150 of a curve 149 of FIG. 2 to provide a voltage drop which in combination with the additional voltage drop of the backward diode 60 switches the transistor 48 into conduction in the saturation region. The tunnel diode 26 may have a low voltage state such as is represented by the point 152 along a load line 151, and when the current increases above the peak current $I_p$, the load changes to that represented by a load line 153 causing the tunnel diode to change state. A curve 155 which represents the collector current $I_C$ versus base to emitter voltage $V_{BE}$ of the transistor 48 shows that the transistor 48 is in the saturation region when the tunnel diode 26 is at the high voltage point 150. The curve 149 is a composite characteristic of the tunnel diode 26 and the backward diode 60. Thus, the potential on the lead 64 is applied to the base of the transistor 50 which is also biased into conduction in the saturation region and current flows from the lead 16 through the collector to emitter path of the transistor 50 to the inductor 40. Therefore, during start up, the series regulator 30 supplies current to the junction point 68 while current flow builds up or increases in the inductor 40. The series regulator 30 operates as a linear regulator when the transistor 72 is conductive because the current flowing therethrough is directly related to the voltage sensed on the lead 34.

As the current applied to the load 37 through the inductor 40 increases, the voltage on the lead 34 increases slightly and an increased amount of current flows through the resistors 128 and 130 of the sensing differential amplifier 46. As a result, the voltage rises at the base of the transistor 106 causing the collector voltage thereof to decrease, which voltage is applied to the base of the transistor 100 to increase the conduction of the transistor 100. Thus, an increased voltage and an increase of current is applied to the base of the transistor 92 and the current flowing through the resistors 78 and 90 and through the collector to emitter path of the transistor 92 increases. The current path through the resistors 78 and 90 and through the transistor 92 may be considered a control path for the series regulator 30 and the shunt regulator 44. This increased current through the resistors 78 and 90 decreases the voltage at the base of the transistor 72 which operates in the linear region to decrease the conduction thereof. Thus, as the current increases through the inductor 40, the current flowing through the transistor 72 to the junction point 68 decreases so that a constant current is supplied to the load and a constant regulated voltage is maintained on the lead 34.

When the current flowing through the collector to emitter path of the transistor 72 decreases to the valley current $I_v$ of FIG. 2, the tunnel diode 26 changes to a low voltage state such as that illustrated by the point 152. At this low voltage state the potential applied from the lead 16 through the tunnel diode 26 and the backward diode 60 is sufficiently high to bias the transistor 48 out of conduction which in turn biases the transistor 50 out of conduction and the switch 24 is turned to an off or non-conductive state. Thus, the current flowing from the inductor 40 to the lead 34 starts to decrease as current flows through the flyback diode 66 and the voltage starts to drop on the lead 34, which voltage drop is applied to the base of the transistor 106. As a result, the transistor 106 decreases current conduction and the potential at the collector of the transistor 106 increases to decrease the conduction of the transistor 100. Thus, the potential at the base of the transistor 92 decreases and less current flows through the path including the resistor 90 and the collector to emitter path of the transistor 92. As a result, the voltage increases at the base of the transistor 72 and an increasing amount of current starts to flow through the tunnel diode 26 and through the collector to emitter path of the transistor 72 to the junction point 68. Thus, during normal regulating operation, the current supplied to the load 37 increases linearly through the series regulator 30 as the current supplied to the load 37 from the inductor 40 decreases when the switch 24 is in the off or non-conductive state.

When the current increase through the tunnel diode 26 and the series regulator 30 is sufficiently large that the peak current $I_P$ of FIG. 2 is reached, the tunnel diode 26 again changes to a high voltage state such as that illustrated by the point 150 and the transistors 48 and 50 are biased into conduction to supply current to the inductor 40. As discussed above relative to start up of the supply, when the switch 24 is turned to the on condition and current is increasing in the inductor 40, the current decreases through the transistor 72 so as to maintain a regulated voltage on the lead 34. Thus, the switch 24 responds to the current supplied to the junction point 68 by the series regulator 30 and the series regulator 30 responds to the differential amplifier 46 to supply an increasing amount of current to the junction point 68 when the current is decreasing through the inductor 40 and to supply a decreasing amount of current to the junction point 68 when the current is increasing through the inductor 40.

Also, as will be discussed subsequently, the time that the switch 24 is turned on varies in response to changes of line voltage on the lead 16 to provide regulation. This regulatory operation to correct for line voltage changes maintains a constant voltage at the lead 34 during the normal switching operation in response to changes of voltage at the source 10 and in response to relatively slow changes of the load 37 which are reflected back as changes on the lead 16. When the load changes are at a rate less than the maximum rate of change of current in the inductor 40, then these load changes are corrected by changing the time that the switch 24 is conductive. The time that the switch 24 is conductive is changed during normal operation in response to voltage changes on the lead 34 being effectively reflected back to the lead 16. The load changes are reflected back because, for example, an increase of load current also increases the current flowing from the unregulated source 10 which, as is well known in the art, will then cause a drop in line voltage so that the switch responds by varying the conducting time as discussed above.

To correct for transient load changes in accordance with this invention, the series regulator 30 responds to increased load current requirements to apply a rapid current increase to the lead 34. A large increase of current utilized at the load 37 decreases the voltage on the lead 34, decreases the conduction of the transistor 106, increases the voltage at the base of the transistor 100 and decreases the potential applied to the base of the transistor 92. Thus, the voltage at the base of the transistor 72 rapidly rises and increased current is applied through the collector to emitter path of the transistor 72 to the lead 34 and the load 37 so that the voltage is maintained relatively constant on the lead 34. The switch 24 is biased into conduction in response to these transient load current increases so that the inductor 40 changes current conduction. The transient load changes that are corrected by this operation are those in which the rate of change of load current is greater than the rate of change of current in the inductor 40.

Another transient which is instantaneously corrected in accordance with this invention when the rate of change of load current is greater than the rate of change of current flowing through the inductor 40 is a sudden increase of load resistance or a decrease of current required by the load 37. The transistor 86 is normally biased out of conduction by the voltage applied to the base thereof as the transistor 92 is conducting a sufficiently small amount of current to maintain the lead 82 at a potential higher than at the junction point 68. The shunt regulator 44 is rendered operative to correct for a sudden decrease of load current causing a voltage rise on the lead 34 which in turn causes an increase of voltage applied to the base of the transistor 106. The transistor 106 conducts an increased amount of current and the potential at the base of the transistor 100 drops to cause the transistor 100 to conduct more current. Thus, the voltage rises at the base of the transistor 92 to bias that transistor into more conduction. As a result, the voltage on the lead 82 drops in value and the transistor 86 of the shunt regulator 44 is biased into a relatively large state of conduction in a linear region. It is to be noted that when the voltage on the lead 82 is sufficiently low to bias the transistor 86 into conduction, the transistor 72 is biased out of conduction so that the series regulator 30 and the shunt regulator 44 are prevented from operating at the same time. When the transistor 86 is biased into conduction, current flows from the junction point 68 through the emitter to collector path of the transistor 86 so that the voltage is maintained on the lead 34 at the regulated value. As the current decreases through the inductor 40 in response to the switch 24 being turned off as the tunnel diode 26 is in the low voltage state when the transistor 72 is non-conductive, the potential at the base of the transistor 92 decreases so that a decreasing amount of current is passed through the emitter to collector path of the transistor 86. When the inductor 40 changes to provide the required current to the load 37, the potential at the lead 82 rises to a value to bias the transistor 86 of the shunt regulator 44 out of conduction and to bias the transistor 72 of the series regulator 30 back into conduction. Thus, the shunt regulator 44 removes excess current from the lead 34 in response to a transient decrease of load current until the inductor changes current and the normal switching operation continues.

Figure 3:
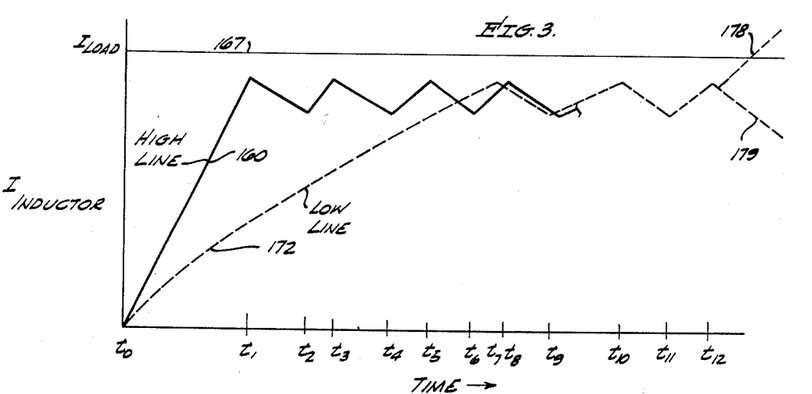
FIG. 3 is a graph of current flowing through the inductor versus time for explaining the current change through the inductor of FIG. 1 during high line and low line start up of the supply and during normal switching operation.
Figure 4:
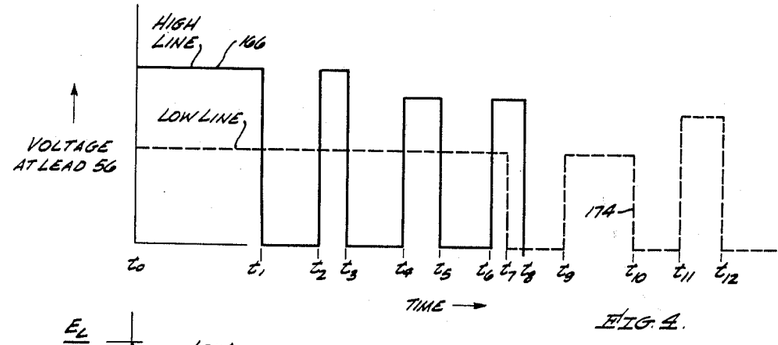
FIG. 4 is a graph of voltage applied to the inductor versus time for explaining the switching operation of the system of FIG. 1 during the current changes of FIG. 3.
Figure 5:
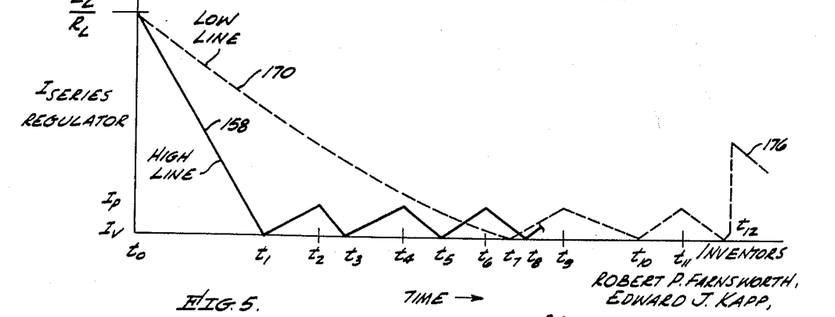
FIG. 5 is a graph of current versus time for explaining the changes of current flowing through the series regulator of FIG. 1 at the same time as the changes of inductor current of FIG. 3.

Referring now to FIGS. 3, 4 and 5 the operation will be explained in further detail for an initial high line condition and a low line condition, that is, the unregulated voltage at the lead 16 is higher than normal or lower than normal. At a time $t_0$, for the high line condition, the switch 15 is closed and the current flowing through the series regulator 30 is at a relatively large value as shown by a curve 158 of FIG. 5. The initial current through the transistor 72 is equal to the voltage $E_L$ on the lead 34 divided by $R_L$. Thus, at time $t_0$ the tunnel diode 26 changes to the high voltage state and the transistors 48 and 50 are biased into conduction so that the switch 24 is turned to the on or closed condition. Also, at time $t_0$, current flows through the collector to emitter path of the transistor 50 and starts to flow through the inductor 40 as shown by a curve 160 of FIG. 3. Between times $t_0$ to $t_1$, the inductor current of the curve 160 increases and the current flowing through the series regulator 30 decreases as shown by the curve 158. During this regulation, the voltage on the lead 34 increases slightly in response to the increase of current flowing through the inductor 40 which controls the sensing differential amplifier 46 to increase the conduction of the transistor 92 and in turn decrease the voltage at the base of the transistor 72 as previously discussed. Thus, the current through the series regulator 30 decreases in response to the increase of current flowing through the inductor 40 so that a constant regulated voltage is maintaining on the lead 34 between times $t_0$ and $t_1$. Therefore, during this system start up the series regulator 30 responds to maintain regulation.

At time $t_1$, the current of the curve 158 decreases to a value of the valley current $I_V$ of the tunnel diode 26 and the tunnel diode is triggered to the low voltage state such as at the point 152 of FIG. 2 to bias the transistors 48 and 50 out of conduction. Thus, the switch 24 is turned to the off condition as shown by a curve 166 of FIG. 4 representing the voltage at the lead 56. Between times $t_1$ and $t_2$, the switch 24 is in the off condition and current flow decreases through the inductor 40 as shown by the curve 160 with the series regulator operating to increase current flow therethrough as shown by the curve 158. At the time $t_2$, the current flowing through the series regulator 30 increases to the tunnel diode peak current $I_P$ as shown by the curve 158 and the tunnel diode changes to the high voltage state to close or turn on the switch 24. Thus, because of the operation of the series regulator 30, the current flowing through the load 37 is maintained constant as shown by a curve 167 of FIG. 3 and the voltage on the lead 34 is regulated.

Between times $t_2$ and $t_3$ the current flowing through the inductor 40 increases as shown by the curve 160 and the current controlled by the series regulator 30 decreases as shown by the curve 158. At time $t_3$, the switch 24 is again closed. For purposes of explanation, it will be assumed that shortly after time $t_3$, the unregulated high line voltage on the lead 16 decreases to an average value, for example. The switch 24 remains in the off condition until time $t_4$ at which time the switch 24 is turned to the on or closed condition and current flowing through the inductor 40 starts to increase as shown by the curve 160. Because the voltage on the lead 56 has decreased, the current increases through the inductor 40 at a slower rate between the times $t_4$ and $t_5$ and the series regulator 30 responds to decrease in current at a slower rate than between times $t_2$ and $t_3$. Thus, as shown by the curve 166, the switch 24 remains closed for a longer period of time when the line voltage decreases. Between times $t_5$ and $t_6$ the switch is in the off condition and between times $t_6$ and $t_8$ the switch is again in the on condition with the on or conducting time of the switch 24 remaining constant as long as the line voltage on the lead 16 does not change. The switch 24 always has a constant off time such as between the times $t_3$ and $t_4$ and the times $t_5$ and $t_6$.

To further explain the operation, a curve 170 of FIG. 5 shows the current flowing through the series regulator 30 when the switch 15 is closed at time $t_0$ with an initial low line condition on the lead 16. Thus, the switch 24 is maintained in the on or closed condition between times $t_0$ and $t_7$ while current increases through the inductor 40 as shown by a curve 172 of FIG. 3. Therefore, the series regulator 30 operates to maintain a regulated voltage on the lead 34. At time $t_7$ the current flowing through the tunnel diode 26 decreases below the valley current $I_V$ and the tunnel diode is triggered to the low voltage state opening or turning off the switch 24. Between times $t_7$ and $t_9$ the current flowing through the inductor 40 decreases and in response to the voltage on the lead 34 the current flowing through the collector to emitter path of the transistor 72 increases until the peak current $I_P$ of the tunnel diode 26 is exceeded. Thus, at time $t_9$, the switch 24 is again turned to the on state. Between times $t_9$ and $t_{10}$ the current flowing through the inductor 40 increases as shown by the curve 172. At time $t_{10}$ the switch 24 is closed being turned on for a period shown by a curve 174 so as to maintain the desired voltage on the lead 34. Because of the low line condition the switch is maintained in the on or conductive condition longer between the times $t_9$ and $t_{10}$ than for the previously discussed high line condition.

Between times $t_{10}$ and $t_{11}$ it will be assumed for purposes of explanation that the unregulated voltage on the lead 16 increases to a higher value. Thus, when the switch 24 is biased into conduction at time $t_{11}$, more current flows through the inductor 40 than between times $t_7$ and $t_9$ and the switch 24 is turned to the off condition at time $t_{12}$ after a relatively short period. Therefore, the time during which the switch is in the off condition remains constant and the switch changes the duty cycle by remaining in the on or conductive condition a longer time to correct for a low line condition and a shorter time to correct for a high line condition. At time $t_{12}$, a transient increase of load current requirements may occur with the series regulator 30 increasing the current flow as shown by a portion 176 of the curve 170 to turn the switch 24 to the on condition so that the current flowing through the inductor 40 increases as shown by a portion 178 of the curve 172. Also, it is to be noted that a sudden decrease of load current causes the inductor current to decrease as shown by a curve 179 with the shunt regulator 44 maintaining regulation. A feature of this invention is that the series regulator has low losses because the normal load quiescent current flowing through the series regulator as shown by FIG. 5 is maintained at a relatively small value as transient load correction is not dependent on the load current. Another feature of the power supply in accordance with this invention is that in systems where maximum utilization of power is required, as the voltage on the lead 16 decreases, the dissipation or loss through the series regulator 30 decreases because of decreased voltage drop thereacross. It is to be noted that the current flowing through the control path including resistors 78 and 90 is relatively small.

Figure 6:
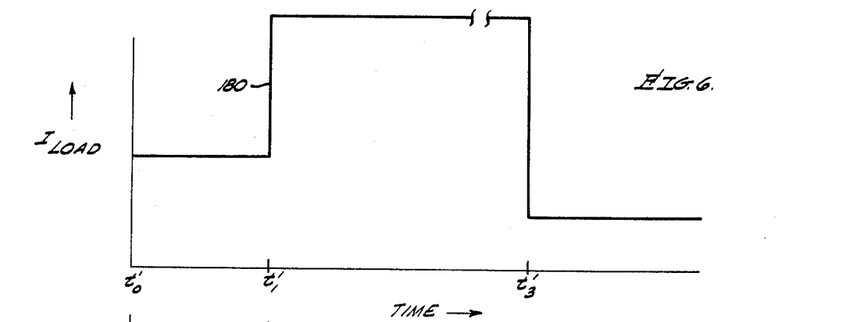
FIG. 6 is a graph showing a possible load current increase and a decrease as a function of time for further explaining the operation of the power supply of FIG. 1.
Figure 7:
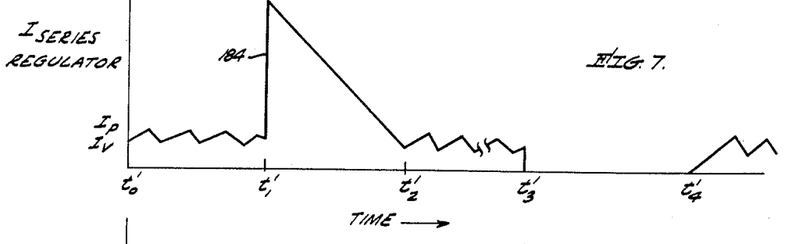
FIG. 7 is a graph showing the changes of load current flowing through the series regulator of FIG. 1 in response to the load changes of FIG. 6.

Referring now to FIGS. 6, 7, 8, and 9, as well as to FIG. 1, the system operation in response to transient load changes will be discussed in further detail. A curve 180 of FIG. 6 shows normal switching regulation as discussed above between times $t_0'$ and $t_1'$ with the current increasing through the inductor and decreasing through the series regulator each time that the switch 24 is biased into conduction. At time $t_1'$ the load current is increased such as by an effective decrease of $R_L$ as shown by the curve 180 which causes the voltage on the lead 34 to instantaneously start to decrease. The increase of load current from a previously regulated value is shown as a large change for purposes of explanation although the system responds in a similar manner to smaller changes of load current requirements. The transient load changes of FIG. 6 has a rate of current change greater than the rate of current changes in the indicator 40. In response to the decrease of voltage on the lead 34 at time $t_1'$, the voltage applied to the base of the transistor 106 increases and current conduction decreases through the transistor 100. Thus, current condition decreases through the collector to emitter path of the transistor 92 and the voltage at the base of the transistor 72 increases resulting in a sudden increase of current flow through the transistor 72 as shown by a curve 184 of FIG. 7. Thus, regulation of voltage on the lead 34 is maintained and the large current flowing through the tunnel diode 26 biases the switch 24 into conduction. Current thus starts to increase through the inductor 40 as shown by a curve 186 of FIG. 8 and the current of the curve 184 decreases to maintain the regulated voltage on the load 34. At a time $t_2'$, the current flowing through the tunnel diode 26 decreases to the valley current $I_V$ and the switch 24 is rendered nonconductive. Thus, between times $t_2'$ and $t_3'$ the inductor current is maintained at a new level higher than at time $t_0'$ as shown by the curve 186 and the normal switching operation continues until another transient change occurs. Therefore, the series regulator 30 provides regulation in response to a sudden increase of current of the load 37 with the normal switching operation discontinued until the inductor current has changed to a new average current level.

Figure 8:
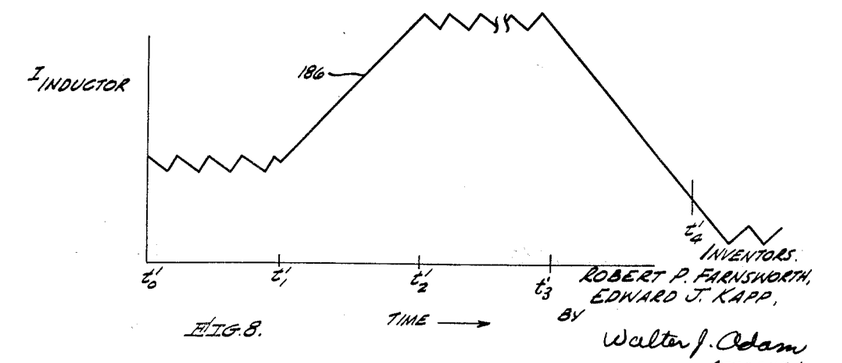
FIG. 8 is a graph showing the changes of load current flowing through the inductor of FIG. 1 in response to the load current changes of FIG. 6.
Figure 9:
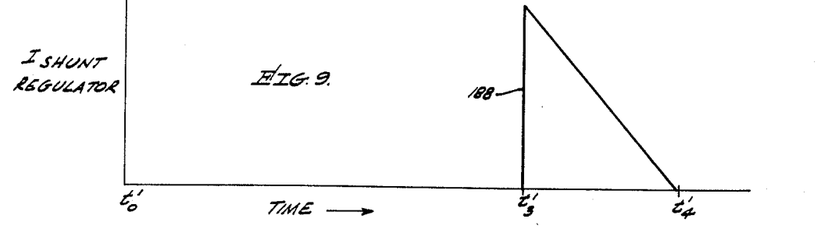
FIG. 9 is a graph showing the changes of current flowing through the shunt regulator in response to the decrease of load current of FIG. 6.

At time $t_3'$ the current requirements of the load 37 as shown by the curve 180 may, for purposes of explanation, be decreased to a value which may be below the current requirements at time $t_0'$ resulting, for example, from the value of $R_L$ increasing. However, the operation is similar for any transient decrease of load current at a rate greater than the rate of current change flowing through the inductor 40. In response to the decrease of load current at time $t_3'$ the voltage on the lead 34 suddenly starts to increase and the transistor 92 increases conduction a substantial amount to decrease the voltage on the lead 82 so as to bias the transistor 86 of the shunt regulator 44 into conduction. The voltage drop at the base of the transistor 72 is sufficient to bias that transistor out of conduction as only the series regulator 30 or the shunt regulator 44 is operative in the system in accordance with this invention. The diode 80 provides a voltage drop to insure that one transistor 72 and 86 turns on when the other turns off or is biased out of conduction. Thus, current flows from the junction point 68 through the transistor 86 and the resistor 88 at time $t_3'$ as shown by the curve 188 of FIG. 9 so that a constant voltage is maintained on the lead 34. As the current flowing through the inductor 40 decreases, as shown by the curve 186 the transistor 92 decreases conduction and in turn the transistor 86 decreases conduction. At time $t_4'$ the current flow through the transistor 86 out of conduction. At the same time the potential on the lead 82 has risen sufficiently to bias the transistor 86 out of conduction. At the same time the voltage at the base of the transistor 72 has increased to a value to bias the transistor 72 back into conduction. Thus, at time $t_3'$ the inductor current of the curve 186 has decreased to a required level, the shunt regulator 44 is rendered inoperative and the series regulator 30 is biased back into operation. Subsequent to the time $t_4'$ with the series regulator again operating, the switching action continues as long as the load remains constant. If at time $t_3'$ the load requirements are reduced to a no load condition, the switch is nonconductive and the shunt regulator passes the majority of the current until the inductor current has effectively decreased to zero.

It is to be noted that in the system operation, the switching operation corrects for load changes which occur at a rate less than the maximum rate of change of current in the inductor. If the load changes are at a rate greater than the maximum rate of change of current in the inductor then the previously discussed transient operations are performed. Under normal operation, a change of load current is corrected by the change of voltage reflected to the unregulated input lead 16 which in turn results in a change of switching pulse width or duty factor as previously discussed. It is also to be noted that in accordance with this invention other type transistors than those shown in FIG. 1 may be utilized by appropriately changing the biasing arrangement in accordance with well known principles.

The regulated voltage on the lead 34 may be selected by varying the values of the resistors 128 and 130 of the voltage divider arrangement or by varying the reference circuit 48.

Therefore, there has been described a power supply that during normal operation utilizes a very small current to correct for changes of current flowing through the inductor. A tunnel diode responds directly to the series regulator current to provide simplified switching with a low current loss. In response to a transient increase of load, the series regulator responds to maintain regulation while the current flow through the inductor changes. A shunt regulator is provided to respond to a transient decrease of load current to remove current flowing through the inductor until the inductor changes current conduction. The system in accordance with this invention provides a high degree of voltage regulation with a very high efficiency in response to normal line changes or load changes or in response to very large transient load changes.

What is claimed is:
1. A power supply comprising:
   (a) a load,
   (b) a source of unregulated voltage,
   (c) a switch coupled to said source of unregulated voltage,
   (d) an inductor coupled between said switch and said load,
   (e) a series regulator coupled between said source of unregulated voltage and said load and having a load current path in parallel with said switch and said inductor,
   (f) a negative resistance device coupled in the load current path of said series regulator and to said switch for controlling said switch in response to load current flowing through said series regulator,
   (g) and sensing means coupled to said load and to said series regulator for responding to the voltage at said load to control the current flowing through the load path of said series regulator.

2. A circuit for supplying regulated voltage from an unregulated source of voltage to a load comprising:
   (a) switching means coupled to the source of unregulated voltage and having a control terminal,
   (b) an inductor coupled between said switching means and the load,
   (c) a series regulator coupled between said source of unregulated voltage and said load and having a load current path in parallel with said switch and said inductor,
   (d) a tunnel diode coupled in the load current path of said series regulator and to the control terminal of said switching means to render said switching means conductive and nonconductive in response to current flowing through said series regulator,
   (e) a shunt regulator coupled to said load,
   (f) and sensing means coupled to said load and to said series and shunt regulators for responding to the voltage at said load to control said series regulator and said shunt regulator.

3. A power supply for supplying a regulated voltage to a load from a source of voltage comprising:
   (a) an inductor coupled to said load for providing a first load current component thereto,
   (b) a series regulator coupled between said source and said load and having a load current path for providing a second load current component thereto,
   (c) a switch coupled between said source of voltage and said inductor,
   (d) a tunnel diode coupled in the load current path of said series regulator and to said switch to control the current supplied to said inductor,
   (e) a shunt regulator coupled to said load for removing current therefrom,
   (f) and control means coupled to said load, to said series regulator and to said shunt regulator to control said series regulator to conduct said second load current component in response to rapid increases of current through said load while said first load current component increases and to control said shunt regulator to remove current from said load in response to rapid decreases of current through said load while said first load current component decreases.

4. A circuit for supplying a regulated voltage to a load comprising:
   (a) a source of unregulated voltage having first and second output leads with the first output lead coupled to a first end of the load,
   (b) inductive means having a first end coupled to the second end of said load,
   (c) a switch coupled between the second output lead of said source of unregulated voltage and a second end of said inductive means for applying current thereto, said switch having a control terminal,
   (d) a series regulator coupled between the second lead of said source of unregulated voltage and the second end of said load and having a load current path,
   (e) a tunnel diode coupled in the load current path of said series regulator and to said switch for rendering said switch conductive and nonconductive in response to current flowing through the load path of said series regulator,
   (f) a shunt regulator coupled between the second end of said load and the first output lead of said source of unregulated voltage, (g) and sensing means coupled between the first and second ends of said load and to said series and shunt regulators for controlling said series and shunt regulators in response to the voltage at the second end of said load so that either said series regulator or said shunt regulator is operative.

5. A power supply comprising:
  (a) a load having first and second ends,
  (b) a source of unregulated voltage having first and second output leads with the first output lead coupled to the first end of said load,
  (c) an inductor having a first end coupled to the second end of said load for supplying current thereto,
  (d) a switch coupled between the second output lead of said source of unregulated voltage and a second end of said inductor and having a control terminal,
  (e) diode means coupled between the second end of said inductor and the first output lead of said source of unregulated voltage,
  (f) a series regulator having a load current path coupled between the second output lead of said source of unregulated voltage and the second end of said load and having a control terminal for varying the current through said load current path and for preventing current from passing therethrough,
  (g) a tunnel diode coupled in the load current path of said series regulator and to said switch for responding to an increase of current therethrough to bias said switch into conduction and for responding to a decrease of current therethrough to bias said switch out of conduction,
  (h) voltage sensing means coupled between the first and second ends of said load, said voltage sensing means including current control means coupled to the control terminal of said series regulator,
  (i) and a shunt regulator coupled between the first and second ends of said load and to said current control means for responding to the voltage across said load to pass current thereacross when said series regulator is biased out of conduction and said switch is conducting.

6. A voltage regulator for supplying regulated voltage to a load comprising:
  (a) a source of unregulated voltage having first and second output terminals with the first output terminal coupled to a first end of said load,
  (b) an inductor having a first and a second end with the first end coupled to a second end of said load, said inductor having a predetermined rate of current change,
  (c) switching means coupled between the second output terminal of said source of unregulated voltage and having a control terminal for being opened and closed in response to a switching signal,
  (d) a tunnel diode having an anode and a cathode with the anode coupled to the second output terminal of said source of unregulated voltage and the cathode coupled to the control terminal of said switching means for applying switching signals thereto,
  (e) a series regulator transistor of a first conductivity type having a base and having a load current path coupled between the cathode of said tunnel diode and the second end of said load,
  (f) a shunt regulator transistor of a second conductivity type having a base and having a load current path coupled between the second end of said load and the first output terminal of said source of unregulated voltage,
  (g) a control path having first and second terminals with said first terminal coupled to the second output terminal of said source of unregulated voltage, said control path being coupled to the bases of said series regulator transistor and said shunt regulator transistor,
  (h) reference means coupled between the first and second ends of said load,
  (i) and sensing means coupled to the first and second ends of said load and to said reference means, said sensing means including a transistor having a current path coupled between said second terminal of said control path and said first output terminal of said source of unregulated voltage for controlling said series regulator transistor and said shunt regulator transistor so that either said series regulator transistor or said shunt regulator transistor is biased into conduction, said series regulator transistor being biased into conduction in response to an increase of load current at a rate greater than said predetermined rate of change of said inductor, said shunt regulator transistor being biased into conduction in response to a decrease of load current at a rate greater than the predetermined rate of current change of said inductor to pass current across said load from said inductor, said series regulator responding to current changes through said load at a rate less than said predetermined rate to increase current conduction when said switch is biased out of conduction and to decrease current condition when said switch is biased into conduction, said switch responding to the current flowing through said series regulator.

7. A voltage regulator for supplying regulated voltage to a load comprising:
  (a) a source of unregulated voltage having first and second output terminals with the first output terminal coupled to a first end of said load,
  (b) an inductor having a first and a second end with the first end coupled to a second end of said load, said inductor having a predetermined rate of current change,
  (c) switching means coupled between the second output terminal of said source of unregulated voltage and having a control terminal for being opened and closed in response to a switching signal,
  (d) a tunnel diode having an anode and a cathode with the anode coupled to the second output terminal of said source of unregulated voltage and the cathode coupled to the control terminal of said switching means for applying switching signals thereto,
  (e) a flyback diode coupled between the second end of said inductor and the first output terminal of said source of unregulated voltage,
  (f) a series regulator transistor of a first conductivity type having a base and having a load current path coupled between the cathode of said tunnel diode and the second end of said load,
  (g) a shunt regulator transistor of a second conductivity type having a base and having a load current path coupled between the second end of said load and the first output terminal of said source of unregulated voltage,
  (h) a control path including a resistor coupled between the second output terminal of said source of unregulated voltage and the base of said series regulator transistor,
  (i) reference means coupled between the first and second ends of said load,
  (j) and sensing means coupled to the first and second ends of said load and to said reference means, said sensing means including an amplifying transistor having a current path resistively coupled between the base of said shunt regulator transistor and said first output terminal of said source of unregulated voltage and coupled to the base of said series regulator transistor for controlling said series regulator transistor and said shunt regulator transistor so that either said series regulator transistor or said shunt regulator transistor is biased into conduction, said series regulator transistor being biased into conduction in response to an increase of load current at a rate greater than said predetermined rate of change of said inductor, said shunt regulator transistor being biased into conduction in response to a decrease of load current at a rate greater than the predetermined rate of current change of said inductor to pass current across said load from said inductor, said series regulator responding to current changes through said load at a rate less than said predetermined rate to increase current conduction therethrough when said switch is biased out of conduction and to decrease current conduction therethrough when said switch is biased into conduction, said switch responding to the current flowing through said series regulator.

8. A power supply for maintaining a regulated voltage at a load comprising:
(a) a source of unregulated voltage having first and second output terminals with the first output terminal coupled to a first end of the load,
(b) an inductor having a first and second end with the first end coupled to a second end of said load, said inductor having a predetermined rate of current change,
(c) switching means coupled between the second output terminal of said source of unregulated voltage and the second end of said inductor, said switching means having a control terminal,
(d) a diode coupled between the second end of said inductor and the first output terminal of said source of unregulated voltage,
(e) a tunnel diode having an anode coupled to the second output terminal of said source of unregulated voltage and having a cathode coupled to the control terminal of said switching means,
(f) series regulating transistor means having a load current path coupled between the cathode of said tunnel diode and the second end of said load and having a control terminal,
(g) a control path including impedance means coupled between the second output terminal of said source of unregulated voltage and the control terminal of said series regulating transistor means,
(h) and sensing means coupled to the second and first ends of said load, said sensing means including an amplifying transistor having a current path coupled between the control terminal of said series regulating transistor means and said first output terminal of said source of unregulated voltage, whereby said series regulating transistor means responds to said sensing means to increase its current conduction or decrease its current conduction when said switching means is respectively nonconductive or conductive and said tunnel diode responds to predetermined currents flowing through said series regulating transistor means to bias said switching means into conduction and out of conduction to maintain the regulated voltage at said load when the rate of current change through said load is less than the predetermined rate of current change of said inductor, said series regulating transistor means responding to an increase of current through said load at a rate greater than the predetermined rate of said inductor to pass said current to maintain the regulated voltage at said load, and to bias said switching means into conduction.

References Cited by the Examiner
UNITED STATES PATENTS 2,776,382 1/57 Jensen _________________ 323—22
2,912,638 11/59 McNamee _____________ 323—22

OTHER REFERENCES

G.E. Tunnel Diode Manual—"Switches," chapt. 5, pp. 45–57, March 1961.

LLOYD McCOLLUM, *Primary Examiner.*

UNITED STATES PATENT OFFICE
CERTIFICATE OF CORRECTION

Patent No. 3,174,094 March 16, 1965

Robert P. Farnsworth et al.

It is hereby certified that error appears in the above numbered patent requiring correction and that the said Letters Patent should read as corrected below.

In the grant, line 1, for "Robert F. Farnsworth" read -- Robert P. Farnsworth --; column 2, line 58, after "switch" insert --24 --; column 3, line 58, for "134" read -- 34 --; column 6, line 7, for "fo" read -- of --; column 8, line 42, for "indicator" read -- inductor --; column 9, line 19, strike out "out of conduction. At the same time" and insert instead -- has decreased to a very low value and --; line 24, for "$t_{3}$" read -- $t_{4}$ --.

Signed and sealed this 24th day of August 1965.

(SEAL)
Attest:

ERNEST W. SWIDER
Attesting Officer

EDWARD J. BRENNER
Commissioner of Patents